June 19, 1956

E. COLLAT 2,751,155

HOT WATER HEATING SYSTEM CONTROL

Filed May 20, 1955

United States Patent Office 2,751,155
Patented June 19, 1956

2,751,155
HOT WATER HEATING SYSTEM CONTROL

Edgar Collat, Milwaukee, Wis., assignor of one-half to Ira Milton Jones, Milwaukee, Wis.

Application May 20, 1955, Serial No. 509,820

5 Claims. (Cl. 236—46)

This invention relates to heat exchange systems, and although it refers particularly to a hot water heating system of the type wherein the heated water is circulated through radiators located in the space to be heated by means of an electric motor driven circulating pump operating at the dictation of a room thermostat, it also encompasses the use of such a system for cooling purposes.

In the conventional hot water heating system equipped with a circulating pump, the boiler or heating unit is controlled by the temperature of the water therein to provide a reservoir of hot water usually of at least 180° F. to 190° F. Upon demand for heat manifested by closure of the usual room thermostat located in the space to be heated, the circulating pump motor starts and circulates hot water from the boiler through the system and more prticularly through radiators in the space to be heated. As might be expected, at the beginning of this circulation, very hot water is fed into the radiators but as the circulation continues, the colder water displaced from the radiators by the incoming hot water is blended with the hot water in the boiler, and as a result, the radiator temperature, instead of remaining above a desirably high point, drops abruptly. Moreover, with the water in the system being continuously circulated, the temperature recovery in the boiler is extremely slow.

Actual tests have shown that with the conventional system, adjustment of the room thermostat to bring about a 2° rise in temperature from 70° to 72° required forty minutes of pump operation. During the first six minutes, the temperature at the radiators rose from 65° F. to 133° F.; during the next six minutes the radiator temperature dropped to 96° F. and then it slowly climbed back during the remainder of the forty minutes to about 116° F. The burner cut in four minutes past the start of the test and ran for sixty minutes to restore the water temperature to the 185° F. for which its control thermostat was set.

With a view toward improving the efficiency of heat exchange systems of this type, this invention has as its object and purpose to so control the operation of the system as to prevent wasteful recirculation of water and to quickly bring about the desired temperature change in the space being heated.

More specifically, it is an object of this invention to provide a simple, inexpensive control for heat exchange systems of the character described, and especially heating systems, whereby the circulating pump is controlled jointly by the room thermostat and a time switch which stops the circulating pump motor before the radiator temperature begins to drop from the maximum to which it has been brought, to thus prevent the rapid cooling of the radiator which characterizes the past conventional hot water heating systems.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiments of the invention constructed according to the best mode so far devised for the practical application of the principles thereof, and in which.

Referring now particularly to the accompanying drawings, the numeral 5 designates generally a boiler or heating unit which may be of any conventional design and construction and which ordinarily is provided with an oil burner (not shown) to provide the heat needed to heat the water which is circulated through the system. The operation of the burner is under the control of a boiler thermostat (not shown) which is responsive to the temperature of the water in the boiler, and which may be set to maintain the desired water temperature as for instance 185° F.

The water heated in the boiler is circulated through one or more radiators 6 located in the space or rooms to be heated, and connected with the boiler in a closed system, the circulation being effected by a pump 7 driven by an electric motor 8.

Figure 1:
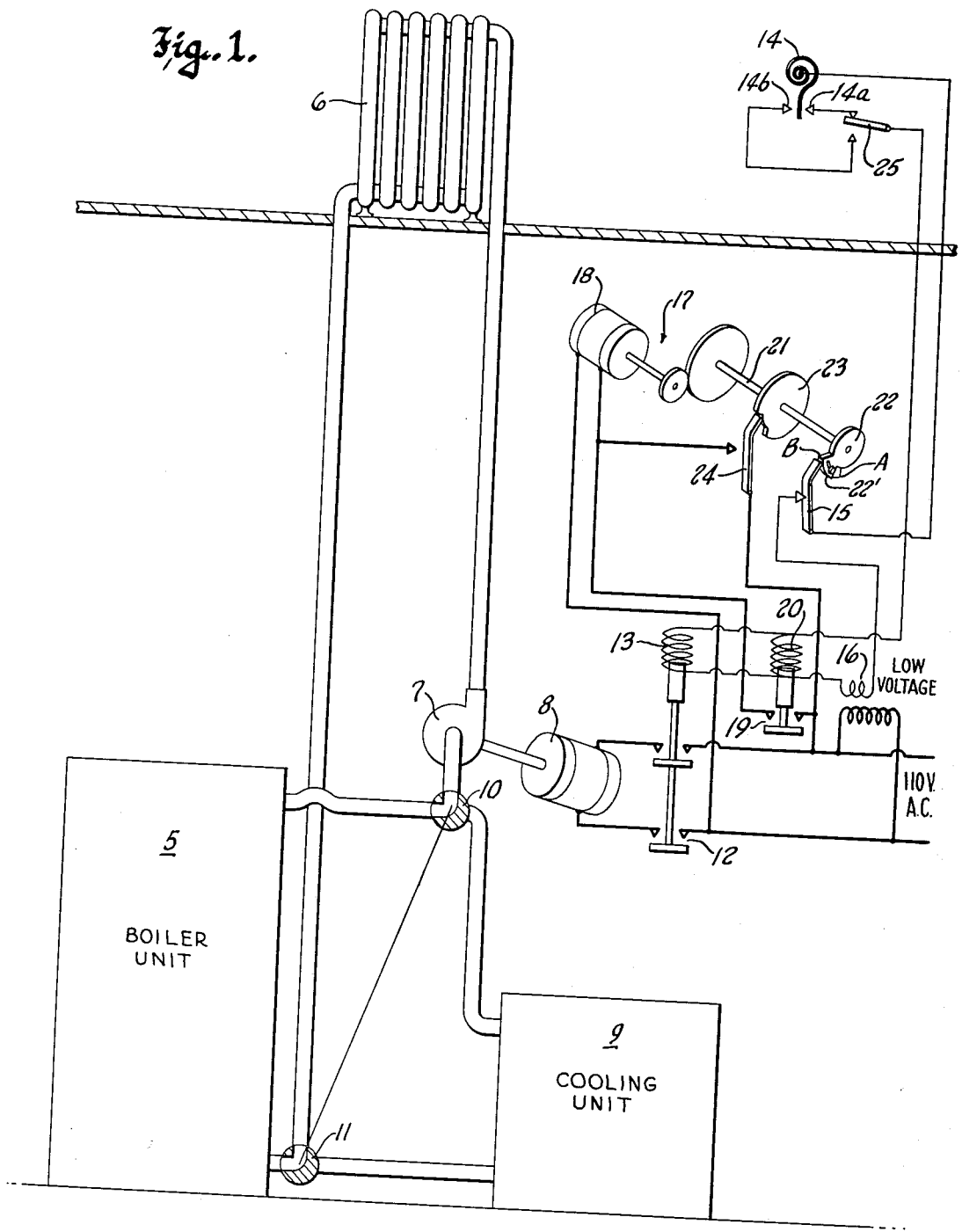
Figure 1 is a diagrammatic illustration of one embodiment of this invention.

If the system is intended for cooling as well as heating, a cooling unit 9 is provided along with means to selectively connect the radiators with either the heating or the cooling unit, as for instance a pair of two-way valves 10 and 11 connected respectively in the feed and return lines of the circulation system. In Figure 1, these valves are shown in the positions they occupy when the system is used for heating.

The motor 8, which drives the circulating pump 7, is connectable to a source of electric current by closure of an electromagnetically actuated switch 12. The closure of this switch is effected by energization of a relay 13. Heretofore, the energization of the solenoid 13 and the consequent starting and stopping of the circulating pump motor was controlled solely by the usual room thermostat 14 so that the circulating pump ran until the thermostat was satisfied.

The present invention places the circulating pump not only under the control of the thermostat 14, but also under the control of a time governed switch 15, which is connected in series circuit with the thermostat, the solenoid 13 and a source of low voltage 16. It follows, therefore, that closure of the thermostat 14 will start the pump motor, providing the time switch 15 is closed, and also that the pump motor will stop when the switch 15 opens despite the fact that the thermostat may still be closed.

The switch 15 is controlled by an electric clock timing mechanism 17 which may be of any conventional design and construction. The motor 18 of the timing mechanism is connectable to a source of alternating current by closure of a relay switch 19, the solenoid 20 of which is adapted to be energized from the source of low voltage 16 upon closure of the thermostat 14 provided, however, that the switch 15 is closed.

The electric clock timing mechanism drives a cam shaft 21 upon which are mounted two switch controlling cams 22 and 23; the former controls the switch 15, and the latter controls a switch 24 which is connected in parallel with the relay switch 19 to maintain the energizing circuit for the clock motor 18 closed independently of the switch 19. The switch 24 thus provides means for maintaining the timing mechanism operative for a definite time cycle once said mechanism has been started. To this end, the switch 24 is normally open, but its cam 23 is so shaped that after the first few degrees of its rotation, which corresponds to about two minutes, it closes the switch 24 and holds it closed for the balance of the time cycle. The duration of the complete time cycle is, of course, subject to modification, but it has been found that a cycle of twenty (20) minutes brings about the most efficient regulation of a hot water heating system.

The cam 22 which controls the switch 15, is so shaped and placed upon the cam shaft that at the start of the timing cycle the switch 15 is closed and remains closed for approximately five or six minutes when the cam effects opening of the switch to thereby stop the circulating pump motor. Preferably, the length of the active surface 22' of the cam 22 is adjustable so that the portion of each cycle for which the pump operates may be varied within limits.

One end A of the active cam surface 22' may be considered means for effecting the opening of the switch 15 and its other end B may be considered means for effecting reclosure of the switch 15, and the location of this end B is such that reclosure of the switch 15 takes place just before the completion of the time cycle. Reclosure of the switch 15 restores control of the pump motor to the room thermostat 14, so that in the event the thermostat has not been satisfied during the complete period of the time cycle (20 minutes) a second cycle of operation will immediately follow.

To enable the system to be used for both heating and cooling, the thermostat 14 has two sets of stationary contacts 14a and 14b, and the solenoids 13 and 20 are selectively connectable with either of these contacts by means of a switch 25. When the system is used for heating, the stationary contact 14a is used since it is engaged in response to decreasing ambient temperature, and when the system is used for cooling the other stationary contact, 14b is connected in circuit. In either case therefore, it is closure of the thermostat which initiates the operation of the entire mechanism.

Figure 2:
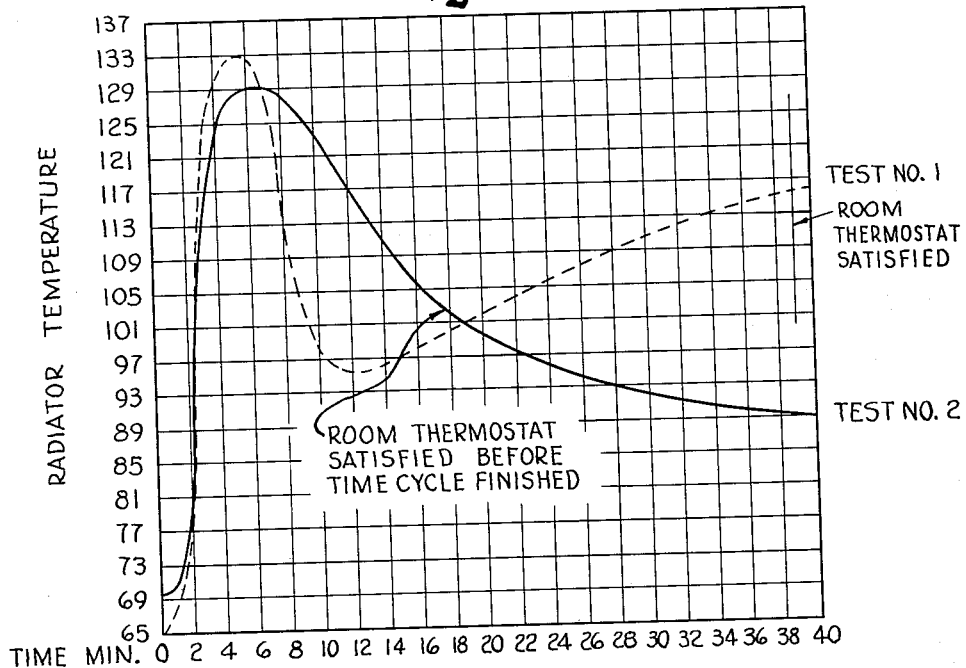
Figure 2 is a graph comparing radiator temperatures taken during two tests of a hot water heating system, the first with the system operated in the conventional manner, and the second with the system operated in accordance with this invention.
Figure 3:
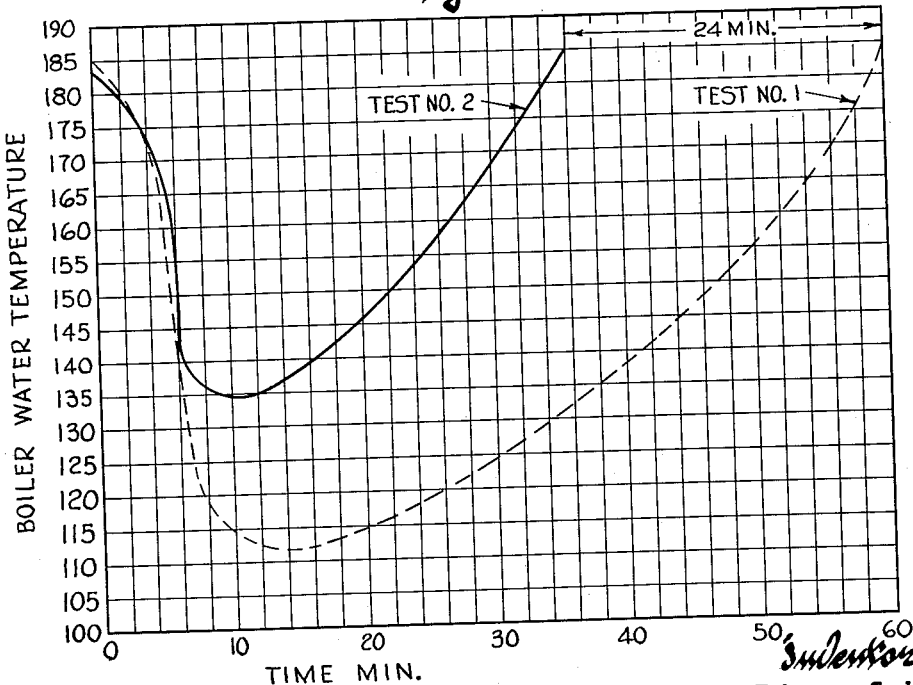
Figure 3 is a graph comparing the boiler water temperatures of the system during these two tests.

The advantages of this invention are graphically portrayed in the charts comprising Figures 2 and 3. In Figure 2 the curves designated "Test No. 1" and "Test No. 2" depict the radiator temperatures during two tests made with a hot water heating system, the first, with the system operating in the conventional manner and the second, with this invention incorporated in the system. It will be seen that in each instance the radiator temperature rose abruptly with the start of the circulating pump.

In Test No. 1, the pump continued to run after the radiator temperature reached maximum, and hence the temperature dropped abruptly to 96° F. from which level it gradually climbed to 116° F., and when this temperature was reached the thermostat was satisfied and the pump stopped, but it took thirty-nine minutes to reach this point.

In Test No. 2, the opening of the time switch 15 stopped the pump at 6 minutes past the start of the cycle. Accordingly, the radiator temperature dropped gradually, and some time prior to completion of the twenty minute cycle, the room thermostat was satisfied. Thus, the desired increase in room temperature was attained at least 15 minutes faster during Test No. 2.

Comparison of the boiler water temperatures depicted by the curves designated Test No. 1 and Test No. 2, in Figure 3, are equally revealing. The significant observation is that in Test No. 2, the temperature of the water in the boiler was restored to 185° F., twenty-four minutes sooner than in Test No. 1.

It follows, therefore, that this invention possesses several very important advantages, notably:

1. Faster and more effective space heating and more comfortable cooling.

2. Reduction in fuel consumption because of quicker restoration of boiler water temperature.

3. Shorter pump operation.

4. Lower over-all operating costs because of less wear on the burner and pump, and the reduction in electricity consumption in addition to the saving in fuel.

In view of these advantages, those skilled in this art will readily appreciate that this invention provides a substantial improvement over comparable heat exchange systems heretofore available.

I claim:

1. A heat exchange system for controlling the temperature of a space, and wherein a liquid heat exchange medium is circulated through heat exchangers located in said space by an electric motor driven circulating pump in response to closure of a thermostat sensitive to the temperature of said space, characterized by the provision of: a timing mechanism; means to maintain the timing mechanism in operation for a definite time cycle after being started; means responsive to closure of the thermostat and connected with the timing mechanism to start the same; a switch connected in series with the thermostat and operatively connected with the control for the circulating pump motor so that both the thermostat and said switch must be closed for the circulating pump motor to run and whereby the opening of said switch stops the circulating pump motor despite the fact that the thermostat may not be satisfied; switch actuating means operated by the timing mechanism to open said switch after a predetermined time short of the complete time cycle of the timing mechanism; and other switch actuating means operated by the timing mechanism at a later time in its cycle to reclose said switch and thereby restore the control of the circulating pump motor to the thermostat.

2. A hot water heating system of the type wherein water heated in a boiler is circulated through radiators located in the space to be heated, by an electric motor driven circulating pump in response to closure of a thermostat sensitive to the temperature of said space, characterized by the provision of: a timing mechanism; means to maintain the timing mechanism in operation for a definite time cycle after it is started; means connected with the timing mechanism and responsive to closure of the thermostat to start the timing mechanism when the thermostat closes; switch means operated by the timing mechanism and connected with the circulating pump motor and the thermostat to take over control of the circulating pump motor and stop the same after a predetermined time short of the time cycle of the timing mechanism despite the fact that the thermostat may still be closed; and means actuated by the timing mechanism before the completion of its time cycle and operable upon said switch means to effect reclosure of said switch means and thereby restore the control of the circulating pump motor to the thermostat.

3. A hot water heating system of the type wherein water heated in a boiler is circulated through radiators located in the space to be heated, by an electric motor driven circulating pump in response to closure of a thermostat sensitive to the temperature of said space, characterized by the provision of: an electric clock timing mechanism; means to maintain the electric clock timing mechanism in operation for a definite time cycle after it has been started; switch means responsive to closure of the thermostat and connected with the electric clock timing mechanism and a source of current to start the timing mechanism when the thermostat closes; a switch connected in series circuit with the thermostat and connected with the control for the circulating pump motor so that both the thermostat and said switch must be closed for the circulating pump motor to run; means driven by the electric clock timing mechanism to open said switch after a predetermined time short of the complete time cycle of the timing mechanism and thereby stop the circulating pump motor despite the fact that the thermostat may not be satisfied; and other switch actuating means operable upon said switch and driven by the timing mechanism to effect reclosure of said switch prior to completion of the time cycle of the timing mechanism to thereby restore the control of the circulating pump motor to the thermostat.

4. A hot water heating system of the type wherein water heated in a boiler is circulated through radiators located in the space to be heated, by an electric motor driven pump, in response to closure of a thermostat sensitive to the temperature of the space to be heated, characterized by the provision of: an electric clock mechanism; means responsive to the closure of the thermostat and connected with the clock mechanism to start the same when the thermostat closes; a cam shaft driven by the clock mechanism to make one complete cycle in a predetermined period of time; switch means connected in parallel with the thermostat and connected with the clock mechanism to maintain the clock mechanism in operation despite opening of the thermostat; a cam on the cam shaft controlling said switch means, said cam holding the switch means open at the start of the cam shaft circle and maintaining said switch means closed until just before the cycle is completed so that said switch means maintains the clock mechanism operative to complete the cam shaft cycle, regardless of the position of the thermostat; other switch means connected in series with the thermostat and hence operable to control the circulating pump motor; and means on the cam shaft controlling said other switch means and operable to open the same at a predetermined time interval after the start of the cam shaft cycle and to reclose the same just before the completion of the cam shaft cycle.

5. A control device for hot water heating systems in which the heated water is circulated through the system by an electric motor driven pump, said control device being adapted to control the operation of the water circulating pump and, comprising: an electric clock mechanism; means to start the clock mechanism upon closure of a room thermostat controlling the operation of the heating system; switch means connected with the clock mechanism to maintain the same in operation for a definite time cycle after the clock mechanism has been started; switch means operated by the clock mechanism to take over control of the operation of the water circulating pump from the thermostat so that the circulating pump may be stopped before the thermostat is satisfied; and means operated by the clock mechanism just prior to the completion of the time cycle of the clock mechanism to reset said last named switch means and thus restore control of the circulating pump to the thermostat.

References Cited in the file of this patent

UNITED STATES PATENTS

| | | |
|---|---|---|
| 2,073,676 | Broderick | Mar. 16, 1937 |
| 2,221,164 | Denison | Nov. 12, 1940 |